US012601593B2

(12) United States Patent
Magnani et al.

(10) Patent No.: US 12,601,593 B2
(45) Date of Patent: Apr. 14, 2026

(54) AUTO-CALIBRATION METHOD FOR INERTIAL MEMS SENSORS

(71) Applicant: STMicroelectronics International N.V., Geneva (CH)

(72) Inventors: Alessandro Magnani, Milan (IT); Matteo Quartiroli, Certosa di Pavia (IT); Alessandro Mecchia, Vimercate (IT)

(73) Assignee: STMicroelectronics International N.V., Geneva (CH)

( * ) Notice: Subject to any disclaimer, the term of this patent is extended or adjusted under 35 U.S.C. 154(b) by 318 days.

(21) Appl. No.: 18/240,955

(22) Filed: Aug. 31, 2023

(65) Prior Publication Data

US 2025/0076048 A1     Mar. 6, 2025

(51) Int. Cl.
    *G01C 19/5712*    (2012.01)
    *G01C 19/5776*    (2012.01)
    *G01C 25/00*     (2006.01)
(52) U.S. Cl.
    CPC ..... *G01C 19/5712* (2013.01); *G01C 19/5776* (2013.01); *G01C 25/005* (2013.01)
(58) Field of Classification Search
    CPC ............ G01C 19/5712; G01C 19/5776; G01C 25/005
    See application file for complete search history.

(56) References Cited

U.S. PATENT DOCUMENTS 9,484,890 B1 *  11/2016  Cazzaniga ......... G01C 19/5726
11,112,269 B2    9/2021  Clark 11,125,580 B1    9/2021  Avantaggiati et al.
2006/0174177 A1  8/2006  Weinstein et al.
2013/0042664 A1 *  2/2013  Wrede .................. G01C 25/005
                          73/1.38

(Continued)

FOREIGN PATENT DOCUMENTS

DE     102014105205 A1 *  11/2014   ......... G01C 19/5776

OTHER PUBLICATIONS

DE-102014105205-A1, English Translation (Year: 2014).*

*Primary Examiner* — Ryan D Walsh

(74) *Attorney, Agent, or Firm* — Seed Intellectual Property Law Group LLP

(57) ABSTRACT

A sensor module includes a pattern generator configured to generate a variable frequency self-test signal. The sensor module includes an inertial sensor including a self-test electrode configured to receive the frequency sweep self-test signal. The inertial sensor is configured to generate an analog sensor signal based on the self-test signal. The sensor module includes an analog to digital converter configured to generate a digital sensor signal based on the analog sensor signal and a demodulator including a first input configured to receive the digital sensor signal, a second input configured to receive the self-test signal, and an output configured to output a demodulated signal. The sensor module includes a first low pass filter coupled to the output of the demodulator and configured to generate a baseband signal. The sensor module includes a calibration circuit configured to identify different MEMS characteristics, like resonance frequency, Q-factor, or sensitivity based on the baseband signal.

21 Claims, 8 Drawing Sheets

(56) References Cited

U.S. PATENT DOCUMENTS

| | | | | |
|---|---|---|---|---|
| 2013/0233048 A1* | 9/2013 | Anac | .................... | G01C 19/56 |
| | | | | 73/1.77 |
| 2017/0328712 A1 | 11/2017 | Collin et al. | | |
| 2019/0020860 A1 | 1/2019 | McVittie | | |
| 2019/0154439 A1 | 5/2019 | Binder | | |
| 2021/0262796 A1 | 8/2021 | Dakshinamurthy et al. | | |
| 2023/0160696 A1 | 5/2023 | Avantaggiati et al. | | |
| 2025/0323650 A1* | 10/2025 | Hu | .......................... | H03L 7/18 |

* cited by examiner

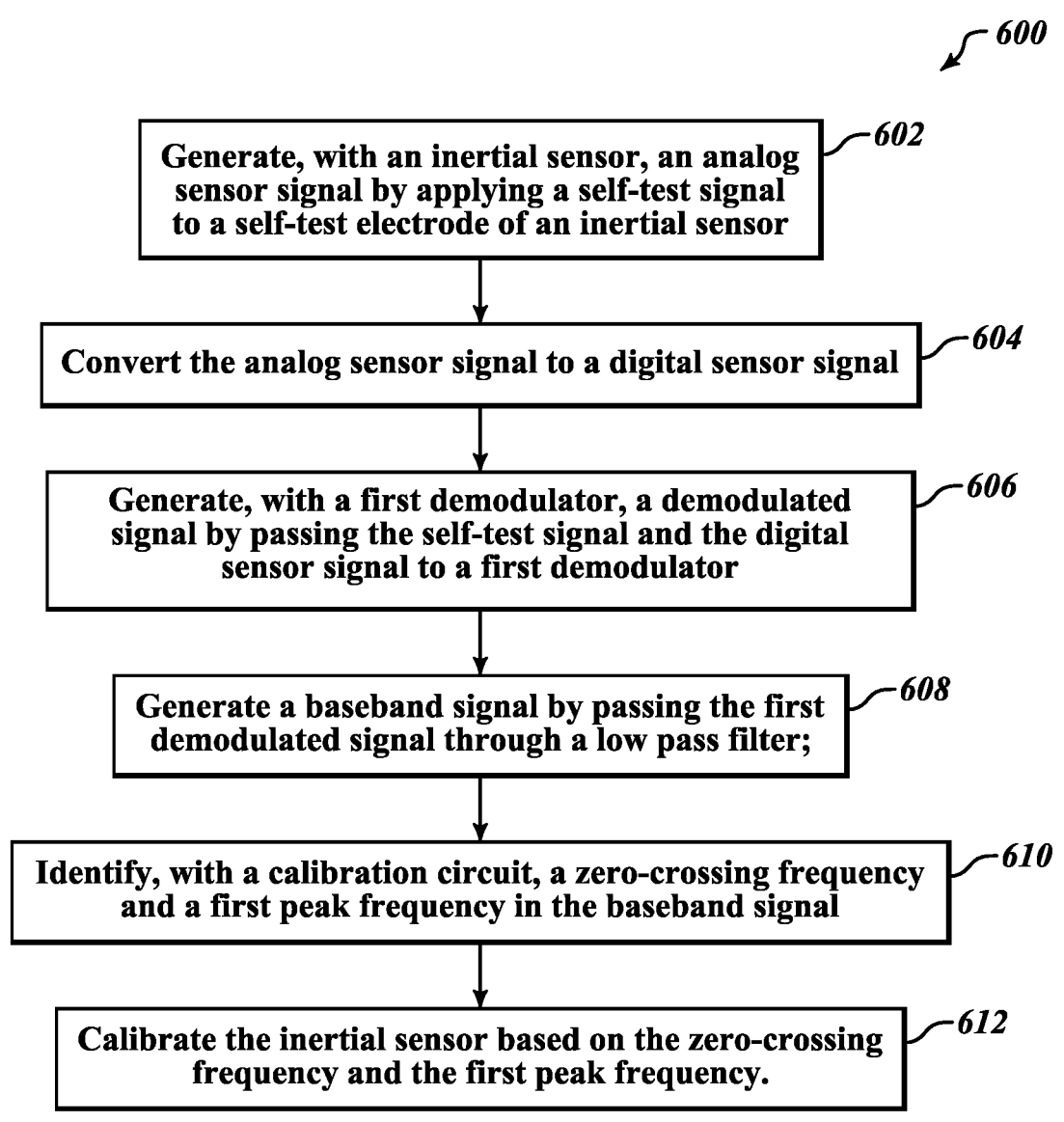

*600*

Generate, with an inertial sensor, an analog sensor signal by applying a self-test signal to a self-test electrode of an inertial sensor  — *602*

Convert the analog sensor signal to a digital sensor signal  — *604*

Generate, with a first demodulator, a demodulated signal by passing the self-test signal and the digital sensor signal to a first demodulator  — *606*

Generate a baseband signal by passing the first demodulated signal through a low pass filter;  — *608*

Identify, with a calibration circuit, a zero-crossing frequency and a first peak frequency in the baseband signal  — *610*

Calibrate the inertial sensor based on the zero-crossing frequency and the first peak frequency.  — *612*

*FIG.6*

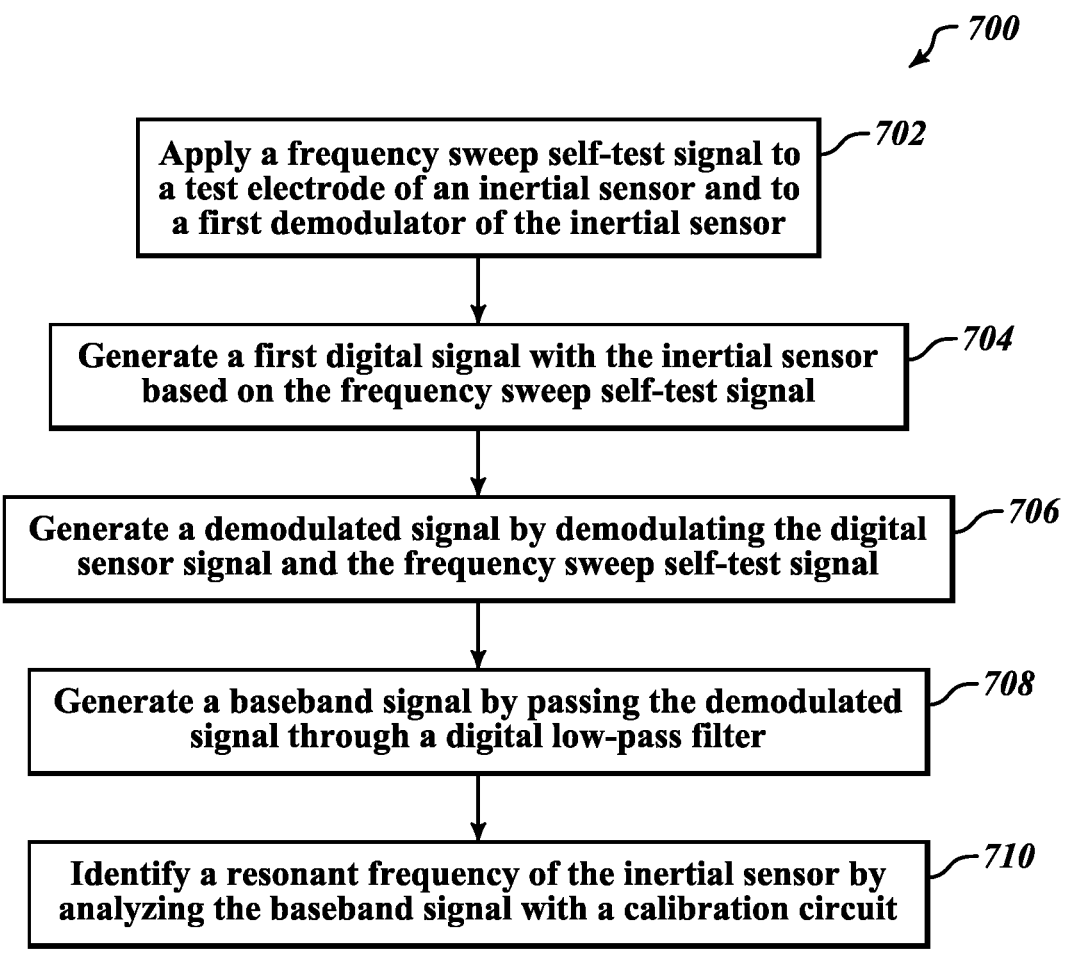

*700*

*702* Apply a frequency sweep self-test signal to a test electrode of an inertial sensor and to a first demodulator of the inertial sensor

*704* Generate a first digital signal with the inertial sensor based on the frequency sweep self-test signal

*706* Generate a demodulated signal by demodulating the digital sensor signal and the frequency sweep self-test signal

*708* Generate a baseband signal by passing the demodulated signal through a digital low-pass filter

*710* Identify a resonant frequency of the inertial sensor by analyzing the baseband signal with a calibration circuit

*FIG. 7*

AUTO-CALIBRATION METHOD FOR INERTIAL MEMS SENSORS

TECHNICAL FIELD

The present disclosure generally relates to inertial sensors, and more particularly to calibration of inertial sensors.

DESCRIPTION OF THE RELATED ART

Inertial sensors are often implemented as microelectromechanical systems (MEMS). MEMS inertial sensors are complex systems based on interactions between mechanical, analog and digital components. Process variations during manufacturing, or drift over time from temperature or aging, can affect the performance of the inertial sensing.

The demand for accurate performance from MEMS inertial sensors is continually increasing. The basic performance of MEMS inertial sensors often is not able to meet performance demands without trimming procedures for parameter calibration. Some calibration techniques can include open-loop step response, closed-loop phase locked testing, self-test checking, and other approaches. However, these traditional techniques often are not able to satisfy demands for advanced performance specifications.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide efficient and effective calibration for MEMS inertial sensors. The calibration process is accurate and utilizes very little time. Embodiments of the present disclosure utilize a dedicated self-test electrode to inject a known electromechanical displacement to the mechanical components of the MEMS inertial sensor. The MEMS inertial sensor outputs sensor signals based on the test signals. The general components of the sensor module analyze the resulting sensor signals. The digital portion of the sensor module can quickly extract parameters from the test signal such as the resonant frequency of the MEMS inertial sensor, the Q factor of the MEMS inertial sensor, and sensitivity parameters of the MEMS inertial sensor.

In one embodiment, a method includes generating, with an inertial sensor, an analog sensor signal by applying a self-test signal to a self-test electrode of an inertial sensor, converting the analog sensor signal to a digital sensor signal, and generating, with a first demodulator, a demodulated signal by passing the self-test signal and the digital sensor signal to a first demodulator. The method includes generating a baseband signal by passing the first demodulated signal through a low pass filter, identifying, with a calibration circuit, a zero-crossing frequency and a first peak frequency in the baseband signal, and calibrating the inertial sensor based on the zero-crossing frequency and the first peak frequency.

In one embodiment, a method includes applying a frequency sweep self-test signal to a test electrode of an inertial sensor and to a first demodulator of the inertial sensor and generating a first digital signal with the inertial sensor based on the frequency sweep self-test signal. The method includes generating a demodulated signal by demodulating the digital sensor signal and the frequency sweep self-test signal, generating a baseband signal by passing the demodulated signal through a digital low-pass filter, and identifying a resonant frequency of the inertial sensor by analyzing the baseband signal with a calibration circuit.

In one embodiment, a device includes a pattern generator configured to generate a frequency sweep self-test signal and an inertial sensor including a self-test electrode configured to receive the frequency sweep self-test signal. The inertial sensor is configured to generate an analog sensor signal based on the self-test signal. The device includes an analog to digital converter configured to generate a digital sensor signal based on the analog sensor signal. The device includes a demodulator including a first input configured to receive the digital sensor signal, a second input configured to receive the self-test signal, and an output configured to output a demodulated signal. The device includes a first low pass filter coupled to the output of the demodulator and configured to generate a baseband signal. The device includes a calibration circuit configured to identify a resonant frequency of the inertial sensor by analyzing the baseband signal.

A sensor module in accordance with principles of the present disclosure can provide various benefits. For example, the sensor module can provide real-time and on the fly measurements and calibration. The sensor module can be immune to external inertial movements because the correlation between the injected/sense signal, which is uncorrelated with an external signal. The sensor module can be immune to amplitude differences of the analog chain, both in temperature and aging. If a digital square pattern is used, complex analog circuits, such as DACs, can be avoided. If a digital square pattern is used, the digital demodulation is a simple sign-version. This simplifies the digital design. A final test in factory can be accelerated with simple and smaller routines. Zero crossing detection of a baseband signal is much simpler than peak based identification points. Calibration process can be executed outside of a CPU. This is beneficial in terms of power, area, and programming.

BRIEF DESCRIPTION OF THE SEVERAL VIEWS OF THE DRAWINGS

FIG. 6 is a flow diagram of a method for operating an inertial sensor, in accordance with one embodiment.

FIG. 7 is a flow diagram of a method for operating an inertial sensor, in accordance with one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1A:
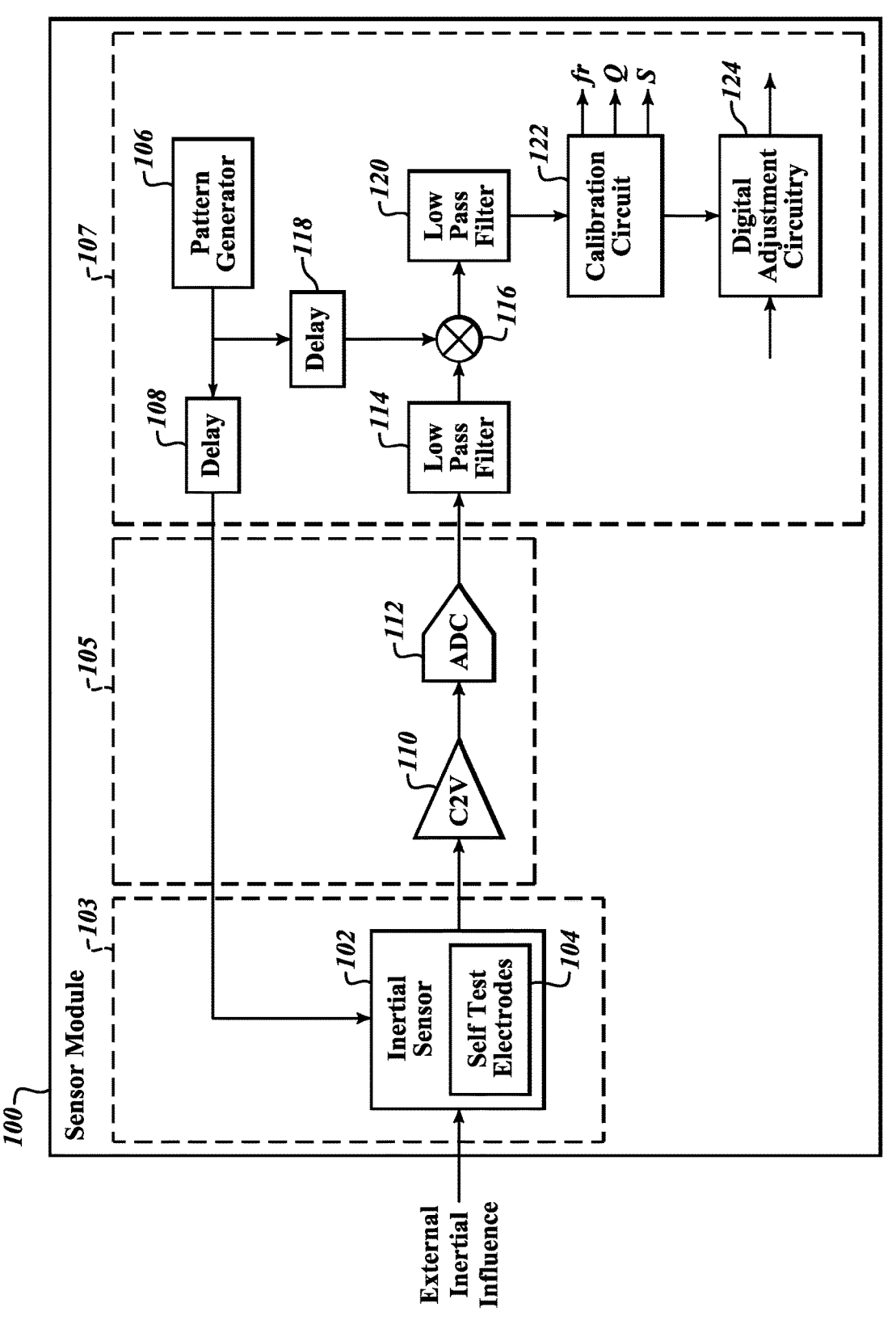
FIG. 1A is a block diagram of a sensor module, in accordance with one embodiment.

FIG. 1A is a block diagram of a sensor module 100, in accordance with one embodiment. The sensor module 100 corresponds to a MEMS sensor module and includes an inertial sensor 102. As will be set forth in more detail below, the components of the MEMS sensor module 100 cooperate to enable effective and efficient calibration of components of the sensor module 100.

The inertial sensor 102 is a MEMS inertial sensor. The MEMS inertial sensor 102 senses inertial forces. The inertial forces can include linear accelerations, gravitational forces, rotational motion, or other types of inertial forces.

In one embodiment, the inertial sensor 102 of FIG. 1A is an accelerometer. As such, the inertial sensor 102 senses linear acceleration or forces. The inertial sensor 102 may sense the force of gravity as well as accelerations.

The inertial sensor 102 may include one or more sensing masses. The sensing masses may be suspended or coupled to one or more fixed masses, or to one or more other mobile masses, by mechanical springs. The inertial sensor 102 may include sensing electrodes, such as capacitive electrodes, that will output capacitive sensor signals based on the position of the one or more sensing masses. Although examples herein will primarily deal with capacitive sensing in the inertial sensor 102, other types of sensing can be performed, such as piezoelectric, piezoresistive, other types of sensing.

In one embodiment, the inertial sensor 102 as a triaxial accelerometer. Accordingly, the inertial sensor 102 may sense accelerations along each of three mutually orthogonal axes. The inertial sensor 102 may include separate sensing masses for each sensing axis. Alternatively, the inertial sensor 102 may sense along only a single axis or along two axes. Various other types of accelerometers can be utilized without departing from the scope of the present disclosure.

The sensor module 100 includes a mechanical portion 103, an analog portion 105, and a digital portion 107. The mechanical portion 103 includes the inertial sensor 102. As used herein, the term "inertial sensor" may refer to the mechanical sensor portion including movable sense masses, drive masses, sense electrodes, drive electrodes, or other mechanical or electromechanical components. As used herein, the term "sensor module" may correspond to the combination of mechanical, analog, and digital components that collectively generate and process inertial sensor signals for utilization by components or devices external to the sensor module 100.

The mechanical portion 103, the analog portion 105, and the digital portion 107 cooperate to generate usable sensor signals. As described herein, the mechanical portion may generate capacitive sensor signals. The analog portion 105 may generate voltage based analog sensor signals from the capacitive sensor signals. The analog portion may also convert the voltage based analog sensor signals to digital sensor signals. The digital portion 107 may process or condition the digital sensor signals for utilization by circuits, components, or devices external to the sensor module 100.

The sensor module 100 may be implemented in one or more semiconductor dies. For example, the inertial sensor 102 may be implemented in a first integrated circuit die. The analog portion 105 and the digital portion 107 may be implemented in a separate integrated circuit die and coupled to the integrated circuit die that includes inertial sensor 102. The integrated circuit die that includes the analog portion 105 and the digital portion 107 may correspond to an application specific integrated circuit (ASIC). Alternatively, the entire sensor module may be implemented in a single integrated circuit die.

The one or more integrated circuits of the sensor module 100 are initially processed in semiconductor wafers. During processing, the semiconductor wafers undergo a large number of processing steps such as material deposition, doping, etching, epitaxial growth processes, thermal annealing, and various other types of processing steps. Due to process variations, a first sensor module 100 formed from one or more first wafers may have somewhat different characteristics than a second sensor module 100 formed from one or more second wafers. For example, the Q factor, the resonant frequency, and the sensitivity of an inertial sensor 102 is based, in part, on processing conditions. Accordingly, two substantially identical sensor modules 100 may have slightly different Q factors, resonant frequencies, and sensitivities.

Due to these variations, it may be beneficial to calibrate the sensor module 100 prior to using the sensor module 100. Furthermore, it may be beneficial to calibrate the sensor module 100 at various times throughout the lifetime of the sensor module 100. The inertial sensor 102 includes self-test electrodes 104 to assist in a calibration process from the sensor module 102. Self-test electrodes 104 can include self-test drive electrodes and self-test sense electrodes. The self-test drive electrodes may receive a test signal as part of the calibration process. The test signal induces a motion in the inertial sensor 102. The self-test sense electrodes generate self-test sensor signals based on the self-test drive signals. As will be set forth in more detail below, the test signal and the self-test sensor signals are utilized to calibrate the sensor module 100. In particular, the test signal of the self-test sensor signals is utilized to identify the Q factor, the resonant frequency, and the sensitivity of the inertial sensor 102.

The digital portion 107 of the sensor module 100 includes a pattern generator 106. The pattern generator 106 generates a test signal having a selected pattern. The test signal can include a square wave, a sine wave, a sawtooth wave, or other types of waveforms. In one embodiment, the pattern generator 106 generates the test signal over a selected frequency range. In an example in which the test signal is a square wave, the pattern generator 106 continuously increases the frequency of the square wave from a starting frequency to an ending frequency. The starting frequency and the ending frequency are selected so that the resonant frequency of the inertial sensor 102 falls between the starting frequency and the ending frequency.

In one embodiment, it is particularly beneficial to utilize a square wave frequency sweep for the test signal. This is because the square wave has only two values (high and low). This enables a single bit test signal with no digital-to-analog converter (DAC) between the pattern generator 106 and the inertial sensor 102. If multibit signals are desired, such as for sine waves, sawtooth waves, or various other waveforms, then a DAC may be implemented between the pattern generator 106 and the inertial sensor 102 to convert the digital pattern to an analog waveform.

The pattern generator 106 applies the test signal to the self-test electrodes 104 of the inertial sensor 102. In particular, the test signal is provided to self-test drive electrodes to induce motion in a mass of the inertial sensor 102. The sensing self-test electrodes of the inertial sensor 102 generate self-test sensor signals based on the induced motion. The self-test sensor signals may correspond to capacitive signals, in an example in which the inertial sensor 102 is a capacitive inertial sensor.

The analog portion 105 of the sensor module 100 includes a capacitance to voltage (C2V) converter 110 coupled to the inertial sensor 102. During calibration, the capacitance to voltage converter 110 receives the capacitive self-test sensor signals from the inertial sensor 102 and generates voltage based analog sensor signals.

The analog portion 105 also includes an analog-to-digital converter (ADC) 112. The ADC 112 receives the analog sensor signals from the capacitance to voltage converter 110 and converts the analog sensor signals to digital sensor signals. The analog portion 105 can include other components without departing from the scope of the present disclosure.

The digital portion 107 includes a low-pass filter 114. The low-pass filter 114 is a digital low-pass filter. The digital low-pass filter 114 allows relatively low frequency signals to pass and filters out higher frequency signals, as well as high-frequency noise. The input of the digital low-pass filter 114 is coupled to the output of the ADC 112. Accordingly, the digital low-pass filter 114 receives the digital sensor signals from the ADC 112. The low-pass filter 114 outputs a filtered digital signal.

The digital portion 107 includes a demodulator 116. The demodulator 116 receives the filtered digital signal from the low-pass filter 114 and receives the test signal from the pattern generator 106. The demodulator 116 generates a demodulated signal. Further details regarding the demodulator and the demodulated signal are provided below.

The digital portion 107 may include a first delay block 108 coupled between the pattern generator 106 and the inertial sensor 102. The first delay block 108 can delay the test signal by a selected amount. The delay block 108 can include a plurality of buffers that each provide a small amount of delay. The number of connected buffers can be selected to provide a desired delay.

The digital portion 107 may also include a second delay block 118. The second delay block 118 is coupled between the pattern generator 106 and a second input of the demodulator 116. The second delay block 118 may also include a plurality of buffers that can be selectively connected or disconnected to provide a desired amount of delay.

Figure 3:
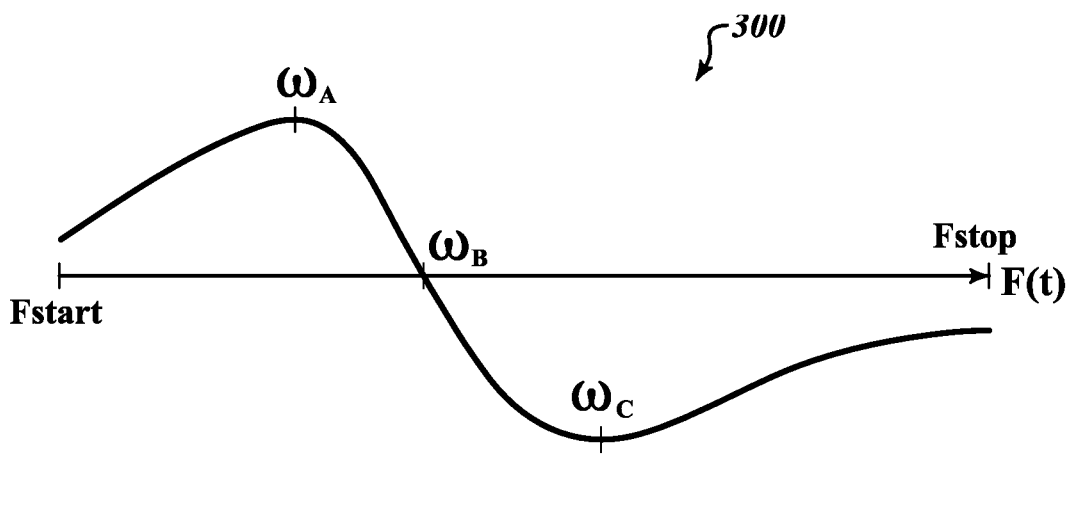
FIG. 3 is a graph illustrating a baseband signal generated by processing sensor signals output from an inertial sensor responsive to a test signal, in accordance with one embodiment.

The digital portion 107 includes a second low-pass filter 120 coupled to the output of the demodulator 116. The second low-pass filter 120 receives the demodulated signal and generates a baseband signal from the demodulated signal by filtering out higher frequencies from the demodulated signal. The baseband signal is shown in FIG. 3.

The digital portion 107 includes a calibration circuit 122. The calibration circuit 122 receives the baseband signal, analyzes the baseband signal, and identifies one or more parameters associated with the inertial sensor 102 based on the baseband signal. For example, the calibration circuit can identify the resonant frequency "Fr", the Q factor "Q", and the sensitivity "S" from the baseband signal. Further details regarding these parameters are provided below.

Demodulating the digital sensor signal with the demodulator 116 produces a digital beat. The low-pass filter 120 shifts the demodulation signal to the baseband by low-pass filtering the high-frequency component of the demodulation signal. Principles of the present disclosure produce a digital beat between the digital sensor signals and the test signal in order to detect the 90° phase shift between. This corresponds to the resonant frequency Fr of the inertial sensor 102. Prior to discussing the resonant frequency in further detail, the test signal and the baseband signal will be discussed in relation to FIGS. 2 and 3.

Figure 2:
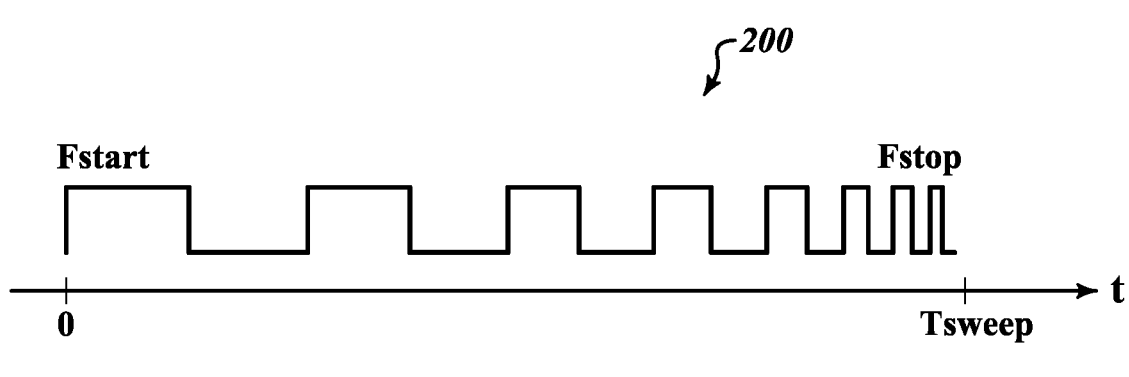
FIG. 2 is a graph illustrating a test signal corresponding to a square wave frequency sweep, in accordance with one embodiment.

With reference to FIG. 2, FIG. 2 illustrates a graph 200 of the test signal, in accordance with one embodiment. The test signal corresponds to a frequency sweep of a square wave. At time t=0, the test signal has a starting frequency Fstart. At the finishing time Tsweep, the test signal has an ending frequency Fstop. Between time t=0 and time Tsweep, the frequency gradually increases. This corresponds to a frequency sweep. Fstart and Fstop are selected so that the resonant frequency Fr of the inertial sensor 102 (which can be roughly estimated based on the design of the inertial sensor 102), falls between Fstart and Fstop. As set forth previously, the test signal induces motion in the inertial sensor 102. The digital sensor signals correspond to the digitized representation of that motion.

While FIG. 2 illustrates a square wave frequency sweep, the test signal can include other types of patterns with a fundamental frequency that spans in any direction around the resonance peak. For example, rather than a frequency sweep, the test signal can include different frequency pattern blocks. Accordingly, the test signal can correspond to a variable frequency self-test signal. The self-test signal can include pseudo-random sequences.

With reference to FIG. 3, FIG. 3 is a graph 300 illustrating the baseband signal, in accordance with one embodiment. The baseband signal is in the frequency domain. The baseband signal has an initial frequency Fstart and a final frequency Fstop. The baseband signal has three defining points in FIG. 3: $\omega a$, $\omega b$, and $\omega c$. $\omega a$ is a first peak, $\omega b$ is the zero crossing, and $\omega c$ is a second peak.

In one embodiment, $\omega b$ corresponds to the resonant frequency Fr of the inertial sensor 102, in the example of an accelerometer. $\omega b$ is a frequency for which a positive peak exists in the baseband signal at a frequency lower than the resonant frequency Fr. $\omega c$ is a frequency for which a negative peak exists in the baseband signal at a frequency greater than the resonant frequency Fr. In the example of a gyroscope, $\omega b$ corresponds to a frequency Fmism related to the gyroscope frequency mismatch.

As can be seen in FIG. 3, the curve is increasing before the resonant frequency Fr because of the gain of the MEMS inertial sensor 102 at frequencies close to resonance. However, one pattern frequency corresponds exactly to the resonant frequency Fr, the result is null in average after the low-pass filter 120. After surpassing the resonant frequency Fr, the curve will switch in sign to negative due to the gain of the MEMS inertial sensor 102 and will gradually extinguish due to MEMS attenuation.

Returning to FIG. 1A, the calibration circuit 122 can identify the resonant frequency Fr for an accelerometer by identifying the zero crossing of the baseband signal. The calibration circuit 122 can identify Fmism for a gyroscope by identifying the zero crossing of the baseband signal. The calibration circuit 122 can identify further parameters as set forth below.

In one embodiment, the calibration circuit 122 calculate the Q factor for an accelerometer based on the characteristics of the baseband signal. In one example, the Q factor Q can be calculated in the following manner:

$$Q = (\omega a * \omega b)/(\omega b^2 - \omega a^2).$$

In one embodiment, the characteristic Q-sense can be calculated by the calibration circuit 122 four a gyroscope based on the characteristics of the baseband signal. In one example, the parameter Q-sense can be calculated in the following manner:

$$Q-\text{sense} = (\omega b + \omega\text{drive})/(\omega c - \omega a).$$

Figure 4:
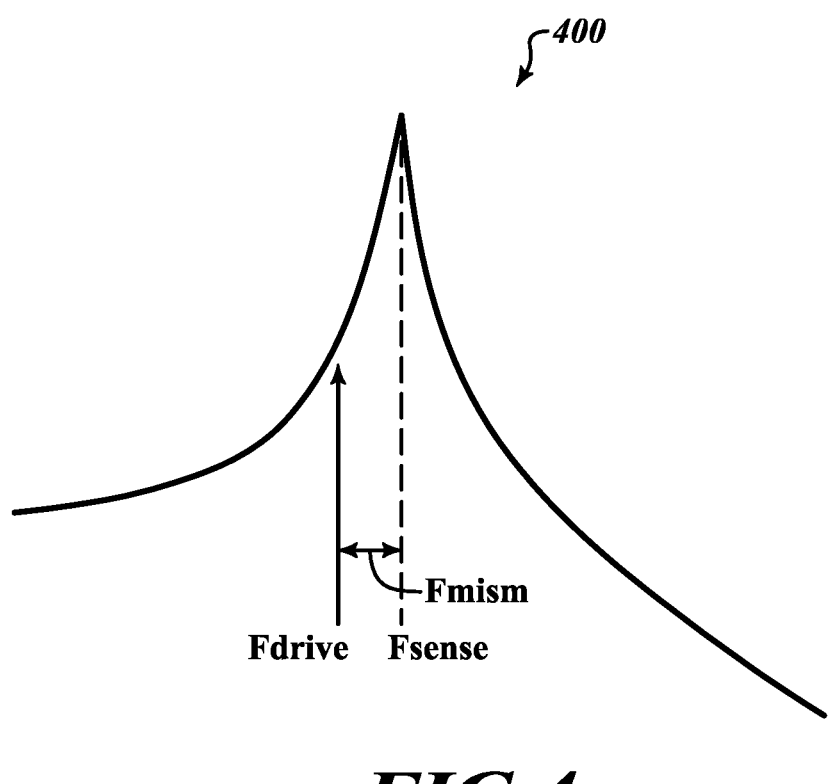
FIG. 4 is a graph illustrating sensor signals from a MEMS inertial sensor, in accordance with one embodiment.

FIG. 4 is a graph 400 illustrating motion of the sense mass of an inertial sensor 102 in which the inertial sensor 102 is a gyroscope, according to one embodiment. The graph 400 illustrates the drive frequency Fdrive of the gyroscope, where $\omega$drive=Fdrive*2pi. FIG. 4 also illustrates the sense frequency Fsense and Fmism.

With regards to sensitivity, the digital pattern operates at lower frequencies where sensitivity training is beneficial. The digital pattern can be a simple square wave with a fixed frequency or a CDMA like pattern. This type of pattern is defined as null-mean and uncorrelated to other CDMA patterns or external signals. In general, is not guaranteed that there is no correlation between the injected pattern and external inertial signals. However, it has been seen in real cases that a CDMA like pattern can be more effective than a fixed frequency square wave because it is more difficult to find a disturbing signal with the same characteristics of the CDMA key.

Accordingly, the analog path sensitivity drift can be estimated by a double measurement. The CDMA pattern can be injected of the time of the trim after manufacture of the sensor module 100 and annotating a memory of the sensor module 100 with the resulting baseband values. This measurement can be repeated after use of the device. The ratio can be calculated between the new baseband value in the one saved the memory. This can be used to adjust the original sensitivity calibration done at factory testing.

The sensor module 100 includes digital adjustment circuitry 124. The digital adjustment circuitry 124 can receive the parameters Fr, Q, Fmism and S from the calibration circuit 122 and can adjust aspects of the digital sensor signals based on these parameters. The digital adjustment circuitry 124 can include digital sensitivity adjustment gain circuitry. In one example, the digital adjustment circuitry 124 includes a notch filter. The notch filter is a band stop filter that passes most frequencies unaltered, but attenuates those in a specific range to very low levels. Accordingly, the notch filter may have a very narrow stop band, corresponding to a high Q factor. The digital notch filter is utilized to process sensor signals during standard operation of the inertial sensor 102. The stop band of the notch filter can be calibrated by the calibration circuit 122 based on one or more of Fr, Fmism, the Q factor, Qsense, and the sensitivity S. The calibration circuit 122 can also calibrate other components of the sensor module 100 based on these parameters in order to promote efficient operation of the sensor module 100.

The calibration process described above can be performed throughout the lifetime of the sensor module 100. Accordingly, the calibration process not only can help calibrate the sensor module 100 based on process variations, but also based on drift from temperature, pressure, voltage, and other parameters throughout the lifetime of the sensor module 100.

Figure 1B:
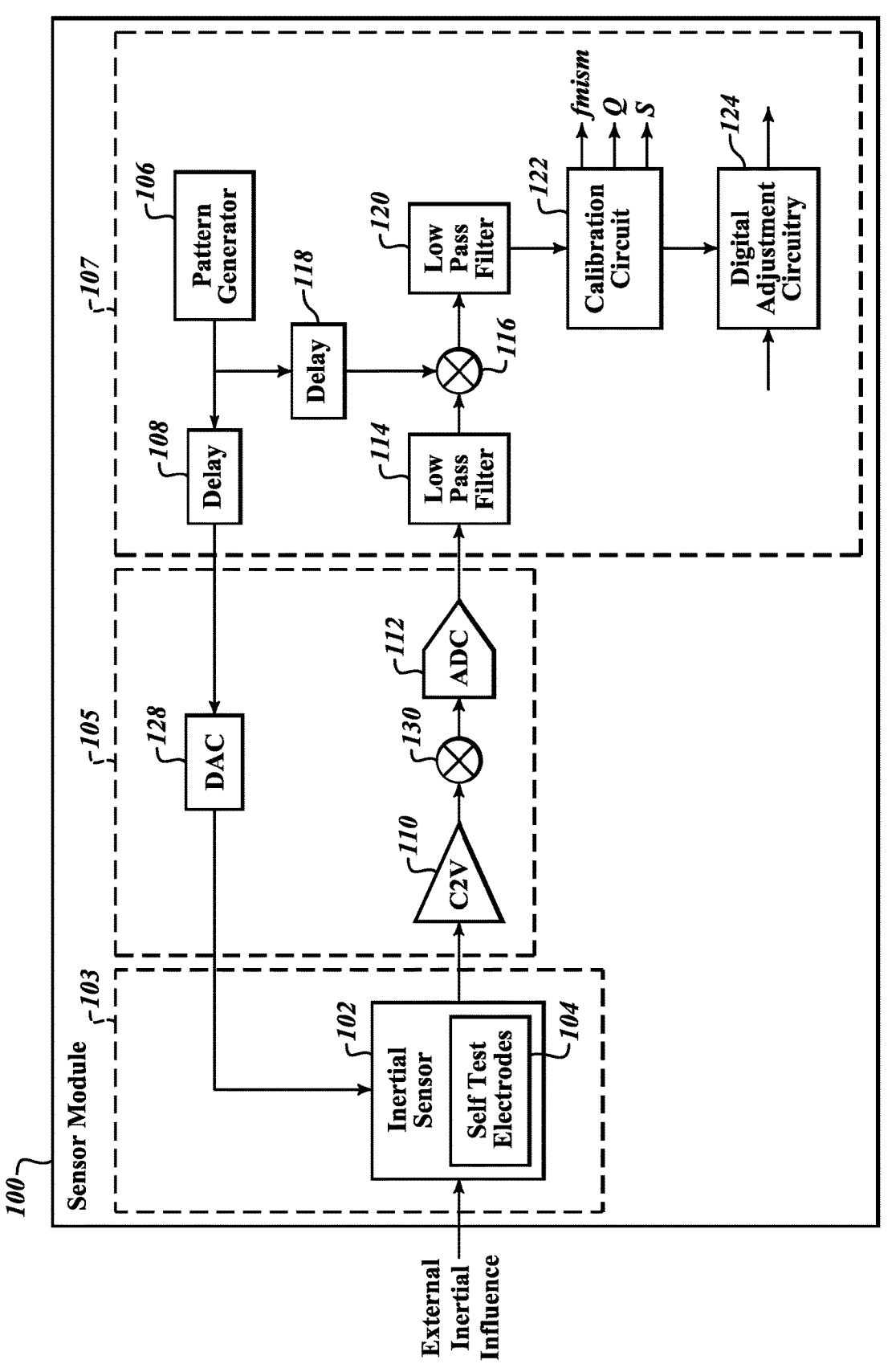
FIG. 1B is a block diagram of a sensor module, in accordance with one embodiment.

FIG. 1B is a block diagram of a sensor module 100 in accordance with one embodiment. The sensor module FIG. 1B is substantially similar to the sensor module 100 of FIG. 1A in many regards. However, in the example of FIG. 1B, the inertial sensor 102 is a gyroscope. A second demodulator 130 is implemented in the analog portion 105 between the capacitance to voltage converter 110 and the ADC 112. Furthermore, the DAC 128 is implemented between the delay 108 and the inertial sensor 102. The DAC 128 can be utilized to convert multibit test signals from the pattern generator 108, such as CDMA like signals, to analog signals for the inertial sensor 102. While the DAC 128 is present in FIG. 1B and not present in FIG. 1A, in practice the DAC 128 can be present in the embodiment of FIG. 1A and can be absent in the embodiment of FIG. 1B. In other words, the DAC 128 can be present or not present in both accelerometers and gyroscopes. Furthermore, in the example of a gyroscope of FIG. 1B, the calibration circuit 122 may provide the frequency Fmism rather than the resonant frequency Fr.

A sensor module 100 in accordance with FIGS. 1A and 1B can provide various benefits. For example, the sensor module 100 can provide real-time and on the fly measurements and calibration. The sensor module 100 can be immune to external inertial movements because the correlation between the injected/sense signal, which is uncorrelated with an external signal. The sensor module 100 can be immune to amplitude differences of the analog chain, both in temperature and aging. If a digital square pattern is used, complex analog circuits, such as DACs, can be avoided. If a digital square pattern is used, the digital demodulation is a simple sign-version. This simplifies the digital design. A final test in factory can be accelerated with simple and smaller routines. Zero crossing detection of a baseband signal is much simpler than peak based identification points. Calibration process can be executed outside of a CPU. This is beneficial in terms of power, area, and programming.

Figure 5:
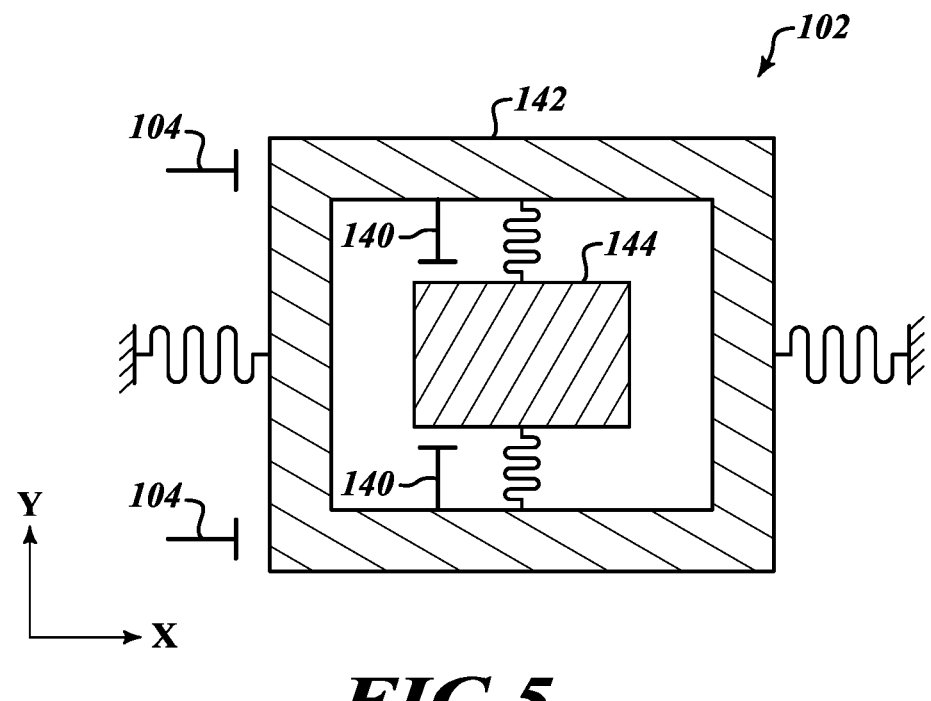
FIG. 5 is a simplified diagram of an inertial sensor, in accordance with one embodiment.

FIG. 5 is a simplified top view of an inertial sensor 102, in accordance with one embodiment. The inertial sensor 102 is one example of an inertial sensor 102 of FIGS. 1A and 1B. The inertial sensor 102 includes self-test a drive mass 142 and a sense mass 144. During calibration, the test signal is provided to the self-test drive electrodes 104, causing oscillation of the drive mass 142. During calibration, the self-test sense electrodes 140 sense the motion of the sense mass 144 by generating the capacitive sensor signals described in relation to FIG. 1A. In practice, the inertial sensor 102 may include other shapes, structures, components without departing from the scope of the present disclosure. In particular, the self-test electrodes 104/140 can have different positions or configurations than those shown in FIG. 5 without departing from the scope of the present disclosure.

FIG. 6 is a flow diagram of a method 600 for calibrating an inertial sensor, in accordance with one embodiment. The method 600 can utilize components, processes, and systems described in relation to FIGS. 1A-5. At 602, the method 600 includes generating, with an inertial sensor, an analog sensor signal by applying a self-test signal to a self-test electrode of an inertial sensor. At 604, the method 600 includes converting the analog sensor signal to a digital sensor signal. At 606, the method 600 includes generating, with a first demodulator, a demodulated signal by passing the self-test signal and the digital sensor signal to a first demodulator. At 608, the method 600 includes generating a baseband signal by passing the first demodulated signal through a low pass filter. At 610, the method 600 includes identifying, with a calibration circuit, a zero-crossing frequency and a first peak frequency in the baseband signal. At 612, the method 600 includes calibrating the inertial sensor based on the zero-crossing frequency and the first peak frequency.

FIG. 7 is a flow diagram of a method 700 for calibrating an inertial sensor, in accordance with one embodiment. The method 700 can utilize components, processes, and systems described in relation to FIGS. 1A-5. At 702, the method 700 includes applying a frequency sweep self-test signal to a test electrode of an inertial sensor and to a first demodulator of the inertial sensor. At 704, the method 700 includes generating a first digital signal with the inertial sensor based on the frequency sweep self-test signal. At 706, the method 700 includes generating a demodulated signal by demodulating the digital sensor signal and the frequency sweep self-test signal. At 708, the method 700 includes generating a baseband signal by passing the demodulated signal through a digital low-pass filter. At 710, the method 700 includes identifying a resonant frequency of the inertial sensor by analyzing the baseband signal with a calibration circuit.

In one embodiment, a method includes generating, with an inertial sensor, an analog sensor signal by applying a self-test signal to a self-test electrode of an inertial sensor, converting the analog sensor signal to a digital sensor signal, and generating, with a first demodulator, a demodulated signal by passing the self-test signal and the digital sensor signal to a first demodulator. The method includes generating a baseband signal by passing the first demodulated signal through a low pass filter, identifying, with a calibration circuit, a zero-crossing frequency and a first peak frequency in the baseband signal, and calibrating the inertial sensor based on the zero-crossing frequency and the first peak frequency.

In one embodiment, a method includes applying a frequency sweep self-test signal to a test electrode of an inertial sensor and to a first demodulator of the inertial sensor and generating a first digital signal with the inertial sensor based on the frequency sweep self-test signal. The method includes generating a demodulated signal by demodulating the digital sensor signal and the frequency sweep self-test signal, generating a baseband signal by passing the demodulated signal through a digital low-pass filter, and identifying a resonant frequency of the inertial sensor by analyzing the baseband signal with a calibration circuit.

In one embodiment, a device includes a pattern generator configured to generate a frequency sweep self-test signal and an inertial sensor including a self-test electrode configured to receive the frequency sweep self-test signal. The inertial sensor is configured to generate an analog sensor signal based on the self-test signal. The device includes an analog to digital converter configured to generate a digital sensor signal based on the analog sensor signal. The device includes a demodulator including a first input configured to receive the digital sensor signal, a second input configured to receive the self-test signal, and an output configured to output a demodulated signal. The device includes a first low pass filter coupled to the output of the demodulator and configured to generate a baseband signal. The device includes a calibration circuit configured to identify a resonant frequency of the inertial sensor by analyzing the baseband signal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, with an inertial sensor, an analog sensor signal by applying a self-test signal to a self-test electrode of an inertial sensor;
converting the analog sensor signal to a digital sensor signal;
generating, with a first demodulator, a demodulated signal by passing the self-test signal and the digital sensor signal to a first demodulator;
generating a baseband signal by passing the first demodulated signal through a low pass filter;
identifying, with a calibration circuit, a zero-crossing frequency and a first peak frequency in the baseband signal; and
calibrating the inertial sensor based on the zero-crossing frequency and the first peak frequency.

2. The method of claim 1, wherein calibrating the inertial sensor includes calibrating a digital notch filter based on the zero-crossing frequency and the first peak frequency.

3. The method of claim 1, comprising calculating a Q factor of the inertial sensor based on the first peak frequency and the zero-crossing frequency.

4. The method of claim 1, wherein the zero-crossing frequency is a resonant frequency of the inertial sensor.

5. The method of claim 1, comprising identifying, with the calibration circuit, a second peak frequency I the baseband signal, wherein the first peak frequency is a positive peak frequency, the second peak frequency is a negative peak frequency, and the zero-crossing frequency is between the first peak frequency and the second peak frequency.

6. The method of claim 5, wherein the inertial sensor is a gyroscope, the method comprising calculating a Q factor of the inertial sensor based on the first peak frequency, the second peak frequency, and the zero-crossing frequency.

7. The method of claim 6, comprising calculating the Q factor based on a drive frequency of the inertial sensor.

8. The method of claim 1, comprising passing the self-test signal to the self-test electrode via a first variable delay element.

9. The method of claim 8, comprising passing the self-test signal to the demodulator via a second variable delay element.

10. The method of claim 9, wherein calibrating the inertial sensor includes adjusting at least one of the first and the second variable delay element.

11. The method of claim 1, wherein the self-test signal is frequency sweep signal.

12. The method of claim 1, wherein the self-test signal is a variable frequency self-test signal.

13. A method, comprising:

applying a frequency sweep self-test signal to a test electrode of an inertial sensor and to a first demodulator of the inertial sensor;

generating a first digital signal with the inertial sensor based on the frequency sweep self-test signal;

generating a demodulated signal by demodulating the first digital signal and the frequency sweep self-test signal;

generating a baseband signal by passing the demodulated signal through a digital low-pass filter; and identifying a resonant frequency of the inertial sensor by analyzing the baseband signal with a calibration circuit.

14. The method of claim 13, wherein identifying the resonant frequency includes identifying a zero-crossing frequency of the baseband signal.

15. The method of claim 14, comprising:

identifying, with the calibration circuit, a first peak frequency of the baseband signal; and calculating a Q factor of the inertial sensor based on the resonant frequency and the first peak frequency.

16. The method of claim 14, comprising:

identifying, with the calibration circuit, a positive frequency of the baseband signal;

identifying, with the calibration circuit, a negative frequency of the baseband signal; and calculating a Q factor of the inertial sensor based on the resonant frequency, the positive peak frequency, and the negative peak frequency.

17. A device comprising:

a pattern generator configured to generate a variable frequency self-test signal;

an inertial sensor including a self-test electrode configured to receive the variable frequency self-test signal, the inertial sensor configured to generate an analog sensor signal based on the variable frequency self-test signal;

an analog to digital converter configured to generate a digital sensor signal based on the analog sensor signal;

a demodulator including a first input configured to receive the digital sensor signal, a second input configured to receive the self-test signal, and an output configured to output a demodulated signal;

a first low pass filter coupled to the output of the demodulator and configured to generate a baseband signal; and a calibration circuit configured to identify a resonant frequency of the inertial sensor by analyzing the baseband signal.

18. The device of claim 17, wherein the calibration circuit is configured to identify the resonant frequency as a zero-crossing frequency of the baseband signal.

19. The device of claim 18, wherein the calibration circuit is configured to identify a first peak frequency of the baseband signal and to calculate a Q factor of the inertial sensor based on the resonant frequency and the first peak frequency.

20. The device of claim 19, wherein the calibration circuit is configured to identify a positive frequency of the baseband signal, to identify a negative frequency of the baseband signal, and to calculate a Q factor of the inertial sensor based on the resonant frequency, the positive peak frequency, and the negative peak frequency.

21. The device of claim 17, wherein the variable frequency self-test signal includes pseudo random sequences.

* * * * *